United States Patent [19]

McCormick et al.

[11] 4,214,762
[45] Jul. 29, 1980

[54] ROLLED METAL PISTON RING

[75] Inventors: Harold E. McCormick, Ballwin; Herbert F. Prasse, Town and Country; William F. Ott; Donald J. Mayhew, both of St. Louis, all of Mo.

[73] Assignee: Ramsey Corporation, St. Louis, Mo.

[21] Appl. No.: 930,792

[22] Filed: Aug. 3, 1978

Related U.S. Application Data

[63] Continuation of Ser. No. 672,752, Apr. 1, 1976, abandoned.

[51] Int. Cl.² .................................................. F16J 9/06
[52] U.S. Cl. .................................................. 277/138
[58] Field of Search ................. 277/138, 139, 140, 143

[56] References Cited

U.S. PATENT DOCUMENTS

| | | |
|---|---|---|
| 2,642,323 | 6/1953 | Duesenberg . |
| 2,830,861 | 4/1958 | Marien . |
| 2,848,288 | 8/1958 | Johnson . |
| 3,134,602 | 5/1964 | Wilson . |
| 3,281,156 | 10/1966 | Mayhew ................ 277/140 |
| 3,370,858 | 2/1968 | Braendel ................ 277/139 |
| 3,378,268 | 4/1968 | Anderson ............... 277/140 |
| 3,467,397 | 9/1969 | Sugahara ............... 277/139 |
| 4,079,949 | 3/1978 | McCormick ............ 277/138 |

Primary Examiner—Robert I. Smith

[57] ABSTRACT

A rolled steel oil control piston ring for internal combustion engines is of generally U-shaped cross section with a pair of opposed rigid sidewalls projecting inwardly of the ring from a central peripheral wall thereof. A pair of flat-faced solid scraper rims formed by closed pleats rolled from the peripheral wall extend outwardly of the ring. The ring is made by rolling flat strip steel stock through a series of profiled rollers. Pleats are formed in the central portion by the profiled rollers and the pleats are closed on themselves to provide the solid scraper rims. The finished strip is then punched to provide the vent openings in the peripheral wall, and coiled and cut to form individual piston rings.

9 Claims, 14 Drawing Figures

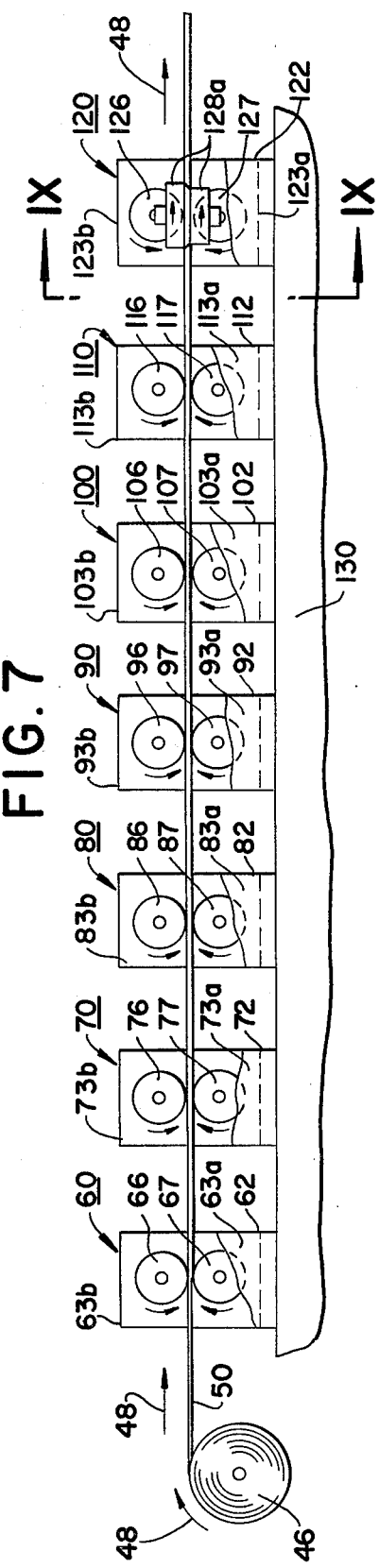
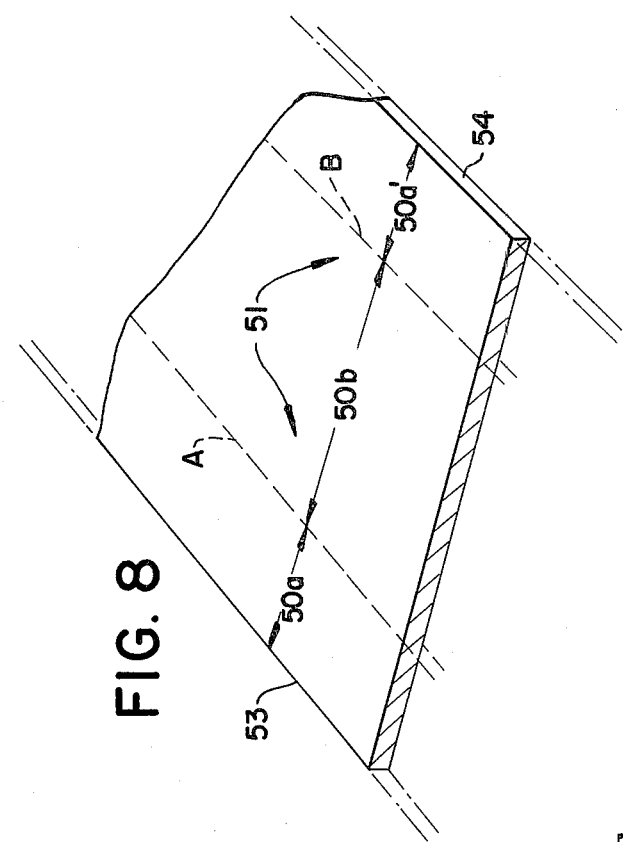
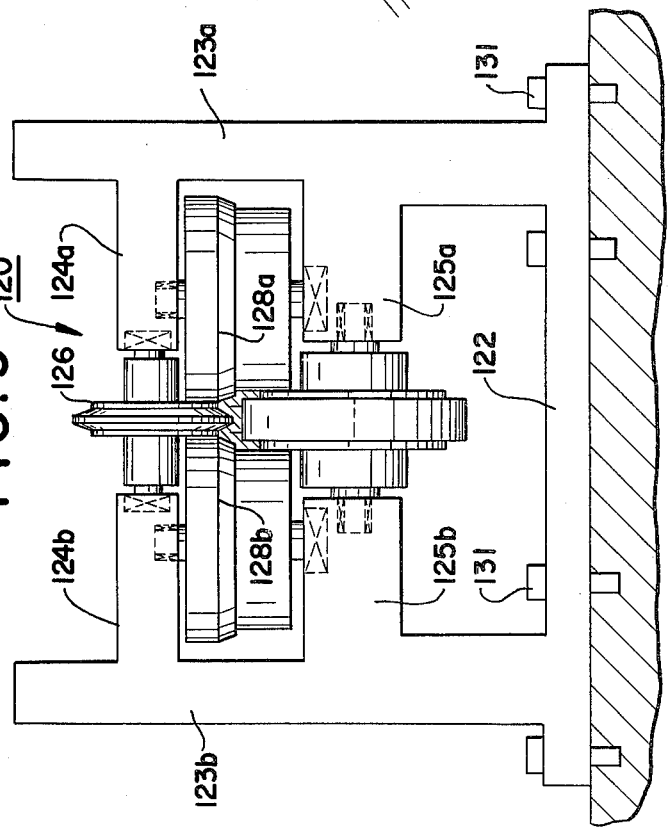
FIG. 7
FIG. 8
FIG. 9

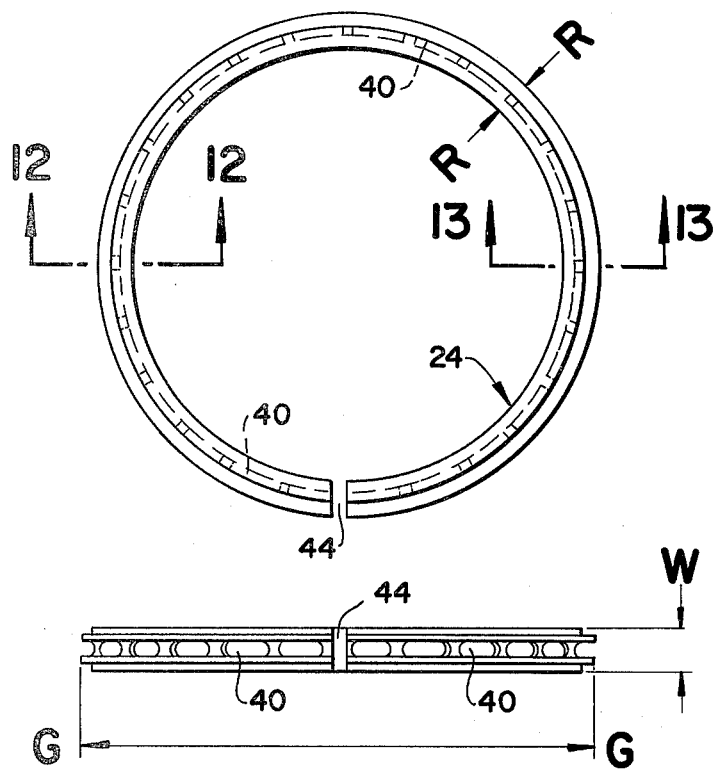
FIG. 10
FIG. 13
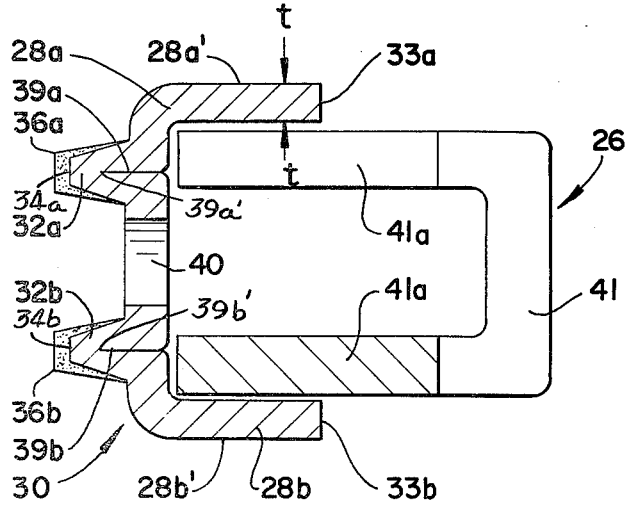
FIG. 11
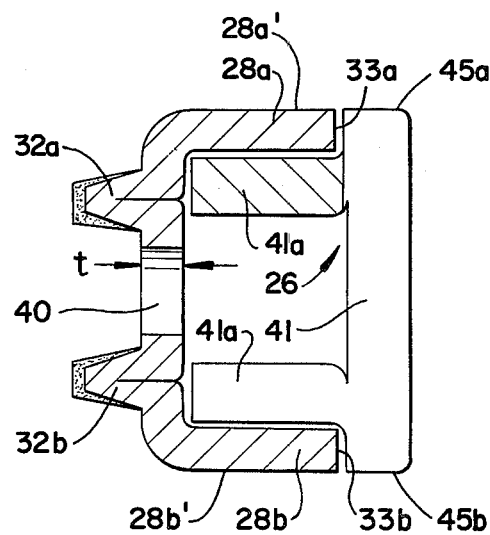
FIG. 12
FIG. 14

ROLLED METAL PISTON RING

RELATED APPLICATION

This application is a continuation of our co-pending application Ser. No. 672,752 filed Apr. 1, 1976 and now abandoned, and is related to our co-pending application Ser. No. 672,751 filed Apr. 1, 1976, now U.S. Pat. No. 4,085,490 dated Apr. 25, 1978.

BACKGROUND OF THE INVENTION

The present invention is concerned with piston rings for internal combustion engines, and particularly with oil control rings. More specifically, the present invention is concerned with a rolled steel oil control piston ring for internal combustion engines. However, the invention is not limited thereto, and concerns piston rings in general.

Oil control rings for reciprocating piston internal combustion engines comprise split, generally circular rings which may be U-shaped in cross section. The rings are adapted to be received in a circumferential groove formed in the piston, with the free ends of the legs of the U (the sidewalls of the ring) projecting inwardly of the ring towards the bottom of the groove, and the connecting central portion of the U (the peripheral wall of the ring) facing outwardly of the groove, towards the cylinder wall. The outwardly facing peripheral wall has scraper rims formed thereon and the ring is thrust outwardly by an expander spring so that the rims engage the cylinder walls. The expander spring usually is disposed in the piston groove between the piston ring and the bottom of the groove, and engages the inside of the piston ring to force it outwardly.

Such oil control rings having a pair of flat-faced scraper rims to engage the cylinder walls, also have vents between the rims of the ring to admit the passage of debris therethrough, as understood by those skilled in the art.

For example, U.S. Pat. No. 3,378,268 assigned to the assignee of the present application, shows in FIG. 1 thereof an oil control ring assembly comprising a one-piece cast iron ring and an expander spring engaged therewith. The expander spring is between the bottom of the piston groove and the oil control ring and serves to expand the ring outwardly into contact with the cylinder wall of the engine. The cast-iron ring has rims formed in the peripheral wall thereof. The rims have flat scraping faces which contact the cylinder wall. The desired configuration of the ring is obtained by providing a casting of suitable shape which is thereafter machined to finished dimensions. Generally, castings are employed in the piston ring field, although it is conceivable that a ring of the desired configuration may be manufactured by a forging operation.

However, the use of cast iron oil control rings has some disadvantageous limitations. The degree of hardness which can be attained in a cast iron ring is limited by the ability to economically machine high hardness parts. If heat treatment to harden previously machined parts is used, part distortion of the small section rings is a problem. Further, cast iron rings are somewhat prone to damage upon installation within the groove of a piston. In addition, the expander spring normally employed in conjunction with the oil control ring is usually made of steel and, being harder than the cast iron ring, tends to wear those portions of the ring which it contacts to expand the ring.

The foregoing limitations can be avoided by forming the oil control ring from a hard metal such as steel. The manufacture of oil control rings by rolling from metal strip stock is also suggested in U.S. Pat. No. 3,378,268. For example, in FIGS. 5 and 7, a rolled oil ring formed from strip metal is shown. It will be appreciated that rolling the ring to proper profile from strip metal and thereafter coiling and cutting rings from the coiled, profiled strip is an efficient and much less expensive method of manufacture than the use of machined castings or of forgings.

The aforesaid patent also illustrates a prior art attempt to correct for large dimensional variations of rolled as opposed to machined cast rings. This attempt is to make the rolled ring from stock which is thin and flexible enough so that dimensional variations could be overcome by deformation of the rings against the cylinder wall surfaces by the expansion force of the expansion spring. (See FIG. 1 of U.S. Pat. No. 3,378,268.) Rings rolled from such relatively thin stock however, are inferior to rings of more rigid stock in terms of ring positional stability and oil scraping characteristics.

It is accordingly an object of the present invention to overcome these and other shortcomings of the prior art.

It is an object of the present invention to provide a rolled metal piston ring, and in particular a rolled metal oil control piston ring which provides rings of closely controlled dimensional variations. It is another object of the invention to provide such a rolled ring which is of rigid construction, being made from relatively heavy stock to impart desired rigidity and improved scraping action to the ring, as compared to the structure of U.S. Pat. No. 3,378,268.

In accordance with the present invention there is provided a piston ring comprising a rolled metal, preferably steel, ring of generally U-shaped cross section having at least one scraping rim formed in the peripheral wall thereof by a pleat folded from the wall and at least partially closed on itself. In a preferred embodiment, the rims are flatfaced. There are two such rims provided, and they extend circumferentially around the peripheral wall of the ring, which also contains vent holes in the ring, between the scraper rims. The U-shape cross section is provided by a centrally disposed peripheral wall from which opposed sidewalls project inwardly of the ring.

After the initial forming of the U-shaped cross section profile, the strip is passed through an extruder-like work space between opposed roll forms in which it is subjected to sufficient pressure to impose an extrusion effect upon the metal by which the cross sectional area of the strip is reduced slightly to form the final cross sectional dimensions thereof.

In accordance with one aspect of the invention, the pleats are formed so that the finished rims have flat scraping faces.

The completed profiled strip is punched to form vent holes therein, and coiled into a helical coil to give a permanent coiled set to the strip. The coils may be severed to any desired coil length for storage or further processing. The scraper rims or the outer face of the ring including the scraper rims, may be provided with a wear resistant coating such as a chromium plated coating or a molybdenum coating. The coiled strip is then cut longitudinally so that a plurality of generally circular, gapped annular rings is formed therefrom.

Certain embodiments of the invention are now described with reference to the accompanying drawings which form a part hereof and wherein:

FIG. 7 is a schematic side view of roll form equipment employed to carry out the roll form step schematically illustrated in FIG. 6;

FIG. 8 is a perspective view of a portion of metal strip usuable to make a piston ring in accordance with the present invention;

FIG. 9 is an end view in elevation of one of the roll stands of the equipment shown in FIG. 7;

FIG. 10 is a plan view of another embodiment of the piston ring of the invention;

FIG. 11 is a side view of the ring of FIG. 10;

FIG. 12 in an enlarged section view along lines 12—12 of FIG. 10; and also shows an expander spring engaging the ring;

FIG. 13 is an enlarged partial section view along line 13—13 of FIG. 11; and

FIG. 14 corresponds to FIG. 12 but shows a different type of expander spring.

Figure 1:
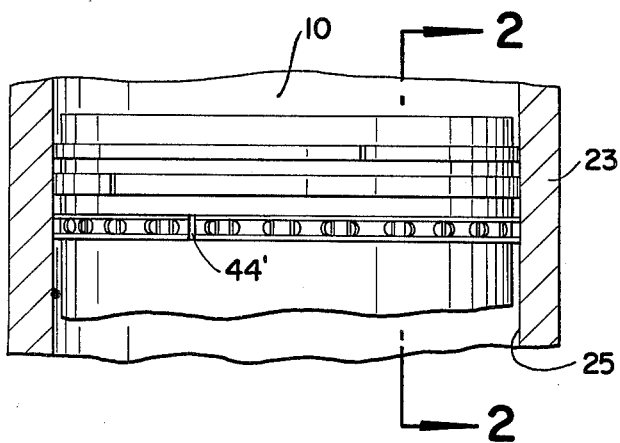
FIG. 1 is a partial view in elevation of the top of a piston of an internal combustion engine, the piston having circumferential grooves formed therein within which are disposed piston rings, including an oil control piston ring in accordance with this invention.
Figure 2:
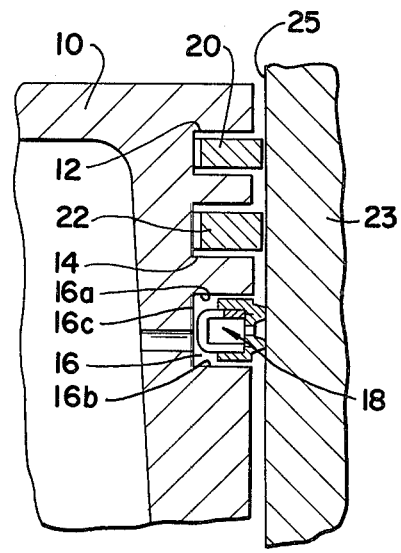
FIG. 2 is an enlarged sectional view taken along the line 2—2 of FIG. 1.

Referring to FIGS. 1 and 2, there is shown in partial view a piston 10 containing a plurality of ring grooves 12, 14 and 16 disposed circumferentially thereabout, ring groove 16 having disposed therein an oil control ring assembly 18 in accordance with the invention. Compression rings 20, 22 are respectively disposed in circumferential groove 12, 14. Piston 10 is disposed within the cylinder 23 of an internal combustion engine, cylinder 23 having a cylinder wall surface 25.

Figure 3:
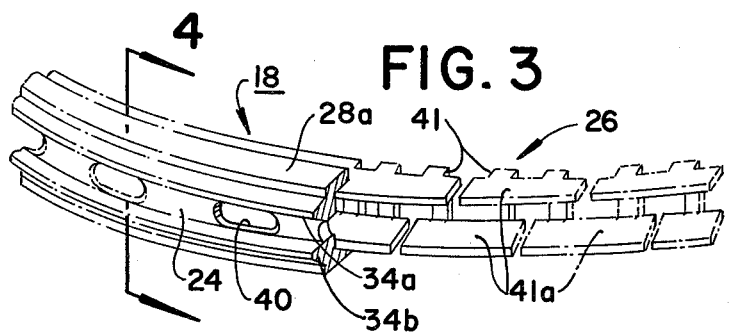
FIG. 3 is a partial perspective view of an assembly of an oil control ring in accordance with the present invention together with an expander spring.
Figure 4:
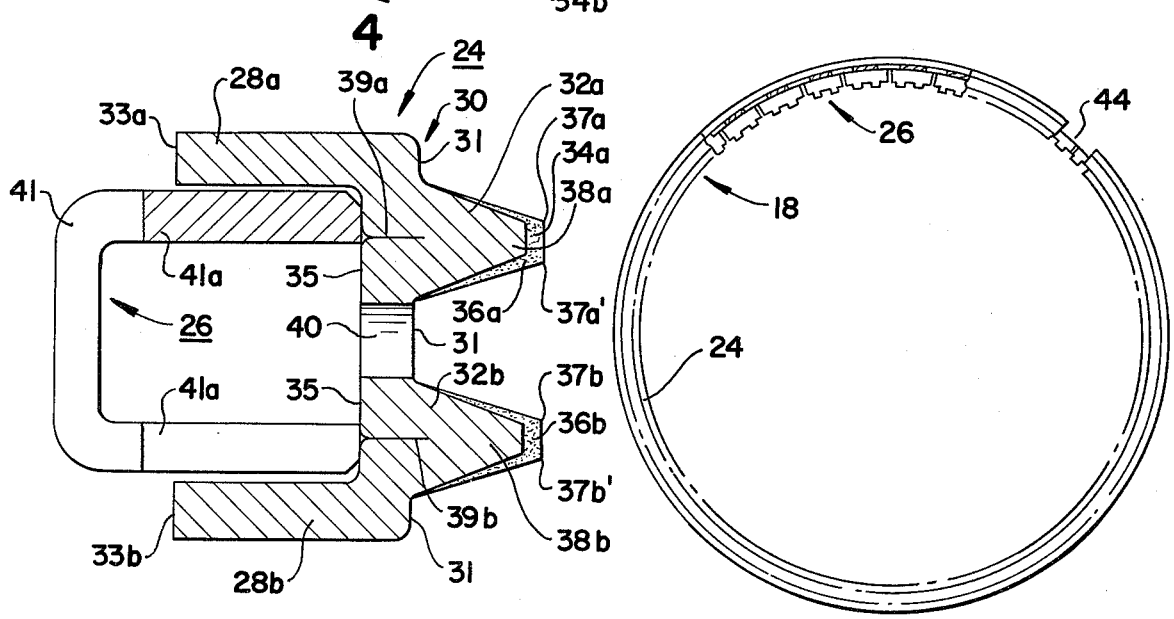
FIG. 4 is an enlarged view in cross section taken along lines 4—4 of FIG. 3.
Figure 5:
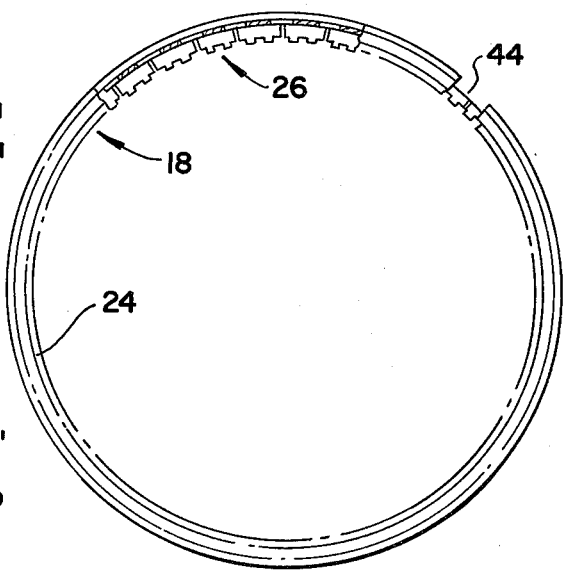
FIG. 5 is a plan view of the assembly of FIG. 3.

Referring now to FIGS. 3, 4 and 5, the piston ring of the invention is generally indicated at 24 assembled together with an expander spring 26. Oil control piston ring 24, as best seen with reference to FIGS. 3, 4 and 5 is of generally circular, split annular construction and has, in cross section (FIG. 4) generally a U-shape. A pair of opposed side walls 28a, 28b project inwardly of ring 24 (towards the center thereof) from, respectively, the uppermost and lowermost portions of intermediate or peripheral wall 30.

A pair of scraping rims 32a, 32b project from peripheral wall 30 outwardly of oil control ring 24. Scraping rims 32a, 32b are each seen to have, respectively, a flat scraping face 34a, 34b facing outwardly of the ring and extending circumferentially therearound. Both of the scraping rims 32a, 32b have hard wear coatings, 36a, 36b, respectively, deposited thereover. The hard wear coatings 36a, 36b increase the wear resistance of scraping faces 34a, 34b against cylinder wall 26 and may comprise any suitable hard facing material such as chromium or molybdenum, to name but two possibilities. The coatings may be applied by plating from an electrochemical bath, by plasma or spray gun plating or any other suitable means. Due to the mode of applying the coating 36a, 36b it usually extends beyond scraping faces 34a, 34b to other portions of peripheral wall 30. It will be understood that such hard facing materials are not always required.

Expander spring 26 engages oil control ring 24 from the inside thereof. As best seen in FIGS. 1 and 2, expander spring 26 is compressed somewhat between oil control piston ring 24 and the bottom wall 16c of circumferential oil control groove 16 (FIG. 2) so that in use, expansion spring 26 forces oil control piston ring 24 outwardly so that the flat faces of scraping rims 32a, 32b engage the cylinder wall 25 of engine cylinder 23 in scraping, sliding engagement therewith. Legs 28a, 28b may be formed with a very slight outward flare as they extend from wall 30. A slight outward flare may improve the seal with the upper and lower surfaces 16a, 16b, respectively, of the groove 16. An inward flare (legs 28a, 28b flared towards each other) is normally not desired.

As is best seen with reference to FIG. 4, oil control piston ring 24 is made from a single strip of metal, for example from flat, generally ribbon-shaped steel stock such as shown in FIG. 8. Preferably 1050 carbon steel stock is used and annealed to make it ductile. After carrying out the various roll forming and other steps described in more detail hereinbelow, the piston ring rolled, coiled and cut from a strip such as that shown in FIG. 8 has the form shown, for example in FIGS. 3–5. Side walls 28a, 28b are formed from the respective longitudinally extending edge portions of the strip and peripheral wall 30 is formed from the longitudinally extending center portion of the strip with scraping rims 32a, 32b being formed from pleats folded in the longitudinally extending center portion of the strip, all as explained in more detail below. As is best seen in FIG. 4 the pleats from which scraping rims 32a, 32b are formed are closed upon themselves to form generally rigid, solid, multi-layer rims 32a, 32b. By "multi'layer" it is meant that the total rim thickness (measured parallel to peripheral wall 30) is formed of effectively a double layer of the original strip thickness for at least a portion of the depth by which the rims 32a, 32b extend from the base 31 of peripheral wall 30. The distal end of scraping rims 32a, 32b, i.e., the ends remote from base 31 of the peripheral wall 30, comprise apex folded portions 38a, 38b and the remainder of scraping rims 32a, 32b contain abutting surfaces indicated 39a, 39b, which extend into and through peripheral wall 30. Surfaces 39a, 39b are in tight abutting contact with each other for almost the entire length thereof, i.e., for at least the major portion thereof.

A plurality of vent openings 40 are provided in oil control piston ring 24 between scraping rims 32a, 32b along the circumference of the ring (FIG. 1). Side walls 28a, 28b have respective edge faces 33a, 33b. Peripheral wall 30 has an inside surface 35.

Expander spring 26 comprises (FIG. 3) a perforated profiled spring of the garter spring, circumferentially expanding type which does not bottom on the bottom 16c of oil control circumferential ring groove 16. Expander spring 26 is compared of circumferentially spaced arcuate segments 41a disposed in two parallel extending rows with the segments of one row being staggered with relation to the segments of the other row. Each segment of one row is connected by one outstanding finger 41 to one segment of the other row and by its other finger 41 to an adjacent segment of the other row. The circumferentially outer edges of arcuate segments 41a engage the inside surface 35 of ring 24 and, in use, thereby press thereagainst and urge piston ring 24 into scraping contact with cylinder wall 25 (FIGS. 2 and 4). As best seen in FIG. 4 the uppermost and lowermost portions of segments 41a are beveled to aid in reducing wear on ring 24.

It will be understood that any other suitable type of expander spring may be employed such as garter type springs of different configuration than that illustrated, coil type expander springs, etc. For example, fingers 28 may have axially projecting portions which engage, respectively, edge faces 33a, 33b of ring 24. It will be further apparent to those skilled in the art that the gap 44 of ring and expander assembly 18 shown in FIG. 5 will, upon being compressed into position within groove 16, be reduced to a quite narrow slit 44' as seen in FIG. 1.

The flat scraping faces 34a, 34b and their respective flat, hard wear coatings 36a, 36b thereover provides an oil scraping surface of excellent characteristics for scraping oil from the surface 26 of cylinder 24. The flat surface is a distinct advantage over prior rolled steel oil control rings which provided but a rounded contact surface against cylinder wall 26. The flat surfaces provide by virtue of its scraping edges 37a and 37a' and 37b and 37b' knife-like edges to scrap oil from the surface and move it ahead of the traveling piston ring.

Figure 6:
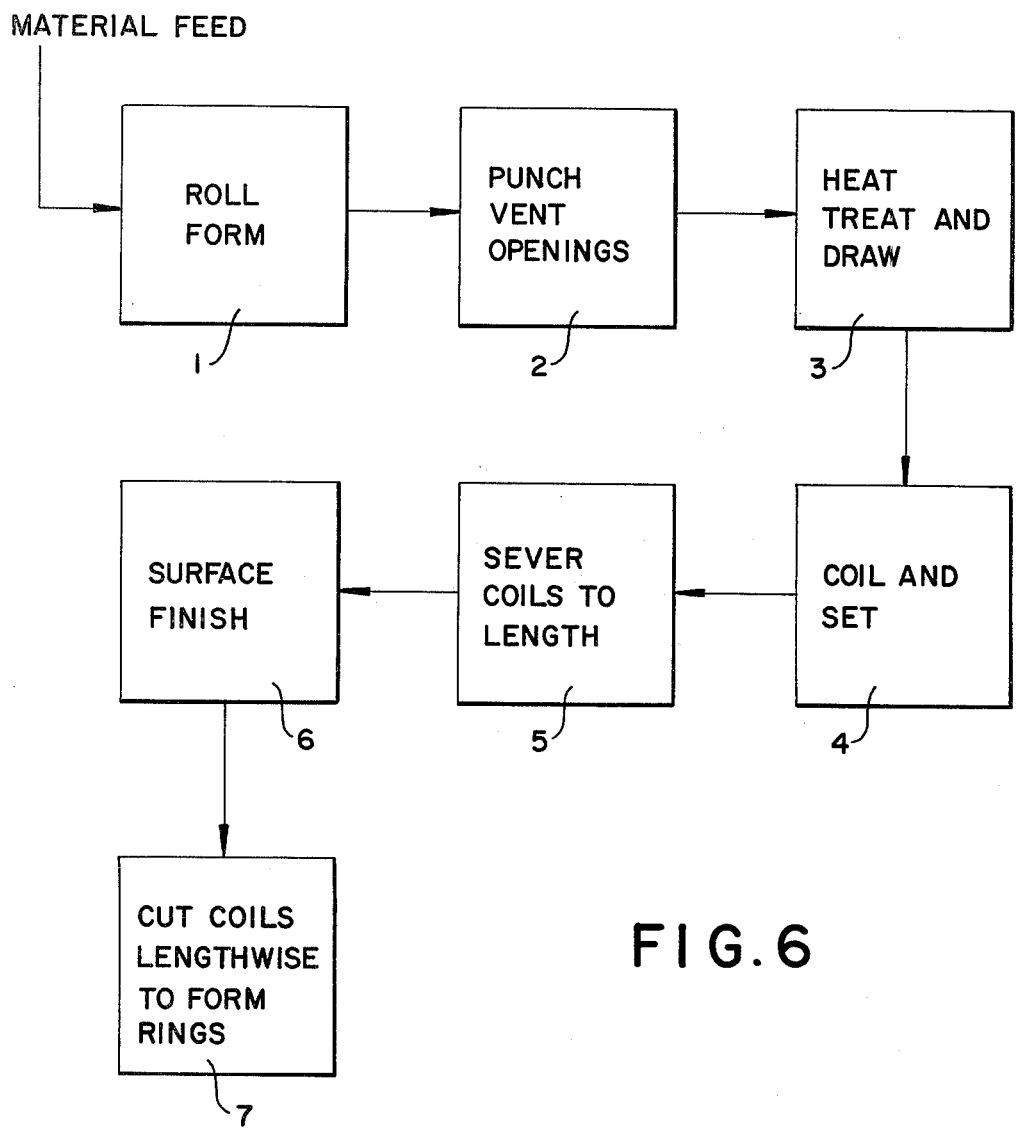
FIG. 6 is a schematic block flow diagram of a process of making piston rings in accordance with the present invention.

FIG 6 shows a block flow diagram of a typical process for manufacturing piston rings in accordance with the invention. Metal strip 50 is fed to a roll form operation indicated by the block 1. The roll form operation may be one such as schematically shown in FIG. 7. During the roll form operation the metal strip is formed into the profiled strip having the scraper rims formed thereon from which the piston rings of the invention are made. After the roll form operation the profile strip is then sent to a punching or other suitable operation indicated by the block 2 in which suitable vent openings are punched in the strip. As indicated by the block 3 in FIG. 6, this may be followed by suitable heat treatment and drawing operation to harden the wire stock. This may be accomplished in the known manner by passing the wire through induction coil heaters, spray quenches and wire drawing apparatus. After the heat treatment operation exemplified by block 3, the profiled material is passed to a coiling operation in which a permanent set is applied to the wire to provide a permanently coiled stock material. This may be accomplished in any suitable manner, usually by coiling the wire about a mandrel and heat setting the wire to a permanent set on the mandrel. This is shown by the "coil and set" block indicated by the numeral 4 in FIG. 6. The coils are then severed to any convenient length of coil in the coil severing step indicated by block 5. With the coil severed to convenient coil lengths, they are then passed to a surface finishing operation. This may include any suitable step such as phosphate treating the coiled metal to impart a suitable surface thereto, and optionally applying a hard, wear resistant facing on the coil, at least to the peripheral wall or the scraping rims or scraping rim faces thereof. The wear resistant coating may be a chromium coating, a molybdenum or molybdenum alloy coating or any other suitable coating applied by any appropriate method such as electroplating, plasma or flame spraying, etc. The surface finishing step is generally indicated by block 6 in FIG. 6. After the surface finishing step is completed the cut coils are severed lengthwise, i.e., longitudinally with respect to the coil so that individual gapped rings are severed from the coil. This is illustrated in block 7 of FIG. 6. It will be appreciated that the particular sequence illustrated in FIG. 6 may be varied, for example at any suitable point thereof, stock may be withdrawn from the process and placed into storage and then reintroduced into the process later on.

Referring now to FIG. 7 there is shown in schematic view roll form equipment utilizable to produce the rolled metal piston ring of the invention. A coil 46 of metal strip 50 is unwound in the direction indicated by the arrows 48 of FIG. 7 to pass metal strip 50 through a series of roll stands 60, 70, 80, 90, 100, 110 and 120.

Referring to FIG. 8, there is shown a perspective broken-away view of a portion of metal strip 50 which is seen to be generally of a flat, ribbon-shape having a first major surface 51 and an oppositely-facing second major surface 52, the major surfaces being bounded by longitudinally extending edges 53, 54. Dotted lines A, B are superimposed on strip 50 in FIG. 8 to indicate edge portions 50a, and 50a' of strip 50 and central portion 50b. Edge portions 50a and 50a' are of equal width and indicate longitudinally extending segments of strip 50 adjacent to, repectively, edges 53 and 54. Central portion 50b indicates the longitudinally extending section which is intermediate end sections 50a and 50a'. It will be appreciated that the divisions of strip 50 into longitudinally extending end portions and a central portion is done for ease of description. Generally, side walls 28a, and 28b of oil control piston ring 24 are made from end sections 50a and 50a' and peripheral wall 30 (and scraping rims 32a and 32b folded therefrom) are made from central portion 50b. However, it is to be understood that the portions of strip 50 described as the "edge portions" do not necessarily have to coincide exactly with side walls 28a, 28b, since the edge portion confined between opposed form rolls in the initial stages of the roll form step may be somewhat more or somewhat less than the amount of strip 50 which is ultimately turned over to form side walls 28a, 28b.

A series of seven roll form stands are shown in FIG. 7, through which metal strip 50 is fed. In the embodiment illustrated, the first 6 roll form stands 60, 70, 80, 90, 100 and 110, each contain a set of two opposed vertical roll forms which are profiled to define a metal working space between them at the region of tangential confluence of the two rolls. The seventh and last roll form stand 120 contains opposed horizontal rollers as well as opposed vertical rollers, all of which sets of opposed horizontal and vertical rollers cooperate to form the metal work space at their point of confluence.

FIG. 9 shows an end view along view line IX—IX and is typical of the construction of the other roll form stands, except for the provision of horizontal, as well as the vertical, roll forms in roll form stand 120.

Referring to FIG. 9, roll form stand 120 comprises a roll form stand base 122 having a pair of opposed stanchions 123a and 123b from which protrude upper journal posts 124a, 124b and lower journal posts 125a, 125b. A vertical top roll 126 and a vertical bottom roll 127 are journaled, respectively, in journal posts 124a, 124b and 125a, 125b. Horizontal top rolls 128a, 128b are each journaled, respectively, in journal post 124a, 125a and 124b, 125b. The rollers are mounted by means of journal shafts (unnumbered) as shown. Roll form stand 120 is affixed to support base 130 by mounting bolts 131.

Roll form stands 60, 70, 80, 90, 100 and 110 are generally similar to roll form stand 120, except that they carry only a pair of opposed vertical rolls and no horizontal rolls.

Accordingly, roll form 60 comprises a roll form support 62 which includes upright stanchions 63a and 63b. Vertical top roll 66 and vertical bottom roll 67 are journaled between stanchions 63a and 63b. Corresponding parts of the other roll forms are correspondingly numbered. The direction of rotation of the respective top and bottom rolls are indicated by the curved arrows associated therewith. In each case, the stanchion shown in the foreground of FIG. 7 (that carrying the "a" designator) is partially broken away to better show the top and bottom vertical rolls (vertical and horizontal rolls in the case of roll form support 120 only).

After emerging from roll stand 120, shown in FIG. 7, vent holes as required may be punched in the strip and the strip subjected to other operations such as heat tempering and drying, coiling, severing, etc. as indicated by the block flow diagram of FIG. 6, explained hereinabove.

In the embodiments of FIGS. 10-14 parts corresponding to those of the embodiment of FIGS. 3-5 are identically numbered. Thus, an oil control piston ring 24 is generally circular in plan view and has a gap 44 therein. A pair of opposed side walls 28a, 28b project inwardly of ring 24. A pair of scraping rims 32a, 32b project from ring 24, which is provided with vent openings 40 (shown in dotted lines in FIG. 11). Typical dimensions for ring 24 of FIG. 10 are 0.134 inches radial wall thickness (dimension R—R in FIG. 10) and 0.187 inches ring width (dimension W—W in FIG. 10). Ring 24 may be made of a metal strip, for example, a steel strip of 0.0175 to 0.0185 inch thickness (dimension t—t in FIGS. 12 and 14). The ring of FIGS. 10-13 may be made, for example, from C-1050 steel which has been given a black oxide surface treatment. Chrome plating 36a, 36b may be applied, for example, by electroplating.

Typical tolerances attainable by production rings of the invention are that scraping faces 34a, 34b must show 360° continuous line contact at gauge diameter of the ring (dimension G—G in FIG. 11). The maximum allowable deviation measured from the true gauge diameter is 0.0003 inches. The scraping faces 34a, 34b must also be in 360° alignment with each other to within 0.0004 inches maximum with reference to the cylindrical plane of the ring. Side walls 28a and 28b must not exceed 0.0003 inch maximum deviation about 360° from a flat surface measured circumferentially on surfaces 28a', 28b' (e.g., FIGS. 12 and 14) at a point from 0.010 to 0.020 inches from the inside diameter of the ring, i.e., from end faces 33a, 33b. The small flare (dimensions f—f in FIG. 13) imparted to the ring is held to a maximum of 0.0015 inches over a length of 0.050 inches of the side walls, measured at a point (line p—p in FIG. 13) which is 0.020 inches from the ring inside diameter, i.e., end faces 33a, 33b. An exaggerated portrayal of the position of the surfaces of side wall 28a is shown by F (outward flare) and F' (inward flare).

The extrusion forces imposed on the ring by the process of the invention insure that surfaces, or more properly, interfaces, 39a, 39b formed by the pressed-together or abutting portions of peripheral wall 30 provide a ring whose strength, rigidity and durability could not be matched for example, by forming scraping rims 32a, 32b as hollow ridges, as is shown by some of the prior art, even if thereafter the hollow was filled with metal or other material which, in any event, might tend to separate from the ring in use. It will be noted that the abutting surfaces 39a and 39b extend from the inner apices 39a', 39b' toward the inner surface of the channel formed by the sidewalls 28a and 28b and intermediate wall 30. Inner apices 39a' and 39b' are formed at the intersection of the inner surfaces of V-shaped sections by rolling rims 32a and 32b out of the plane of the strip 50 by the apparatus shown in FIG. 7. The outer surfaces of the V-shaped sections converge to an outer end or apex at which the flat surfaces 34a and 34b respectively, are formed by the roll 126 (FIG. 9).

FIG. 12 shows a piston ring which may have dimensions as exemplified above with respect to the embodiment of FIG. 10, engaged with an expansion ring 26 similar in shape, but radially proportionately wider, to that shown in FIG. 4, and made of material relatively thicker than the ring. Expansion spring 26 of FIG. 13 may exert an expansion force of 275 psi. No significant outward deflection of sidewalls 28a, 28b is caused thereby.

FIG. 14 shows another embodiment of an expander spring wherein the spring is formed somewhat T-shaped in cross section by having axially projecting knobs 45a and 45b, which engage the piston ring at the edge faces 33a, 33b thereof.

When hard alloy steel such as chromium alloy steels containing sufficient carbon so that a chromium carbide constituent is formed in the alloy of the steel is employed, the necessity of a hard facing alloy such as chromium or molybdenum may be avoided, at least in certain applications. In other applications such as heavy duty diesel engines, the provision of a hard facing such as chromium or molybdenum or any other suitable facing is highly desirable.

While the invention has been described in detail with respect to the specific preferred embodiments thereof it will become apparent upon reading and understanding of the foregoing that numerous alterations and modifications thereto may be made without departing from the scope of the invention. It is intended to include all such modifications and alterations within the scope of the appended claims.

What is claimed is:

1. An oil control piston ring for location in a groove of a piston which moves in a bore in a cylinder of an internal combustion engine, said oil control ring comprising a steel strip having a split annular shape, said strip including a pair of sidewall portions and an intermediate wall portion defining a radially inwardly opening channel, said ring having at its outer periphery a pair of axially spaced cylindrical surfaces for oil scraping engagement with said cylinder bore, said cylindrical surfaces each being located at the juncture of respective radially outwardly extending portions of said strip, said respective radially outwardly extending portions extending radially outwardly with respect to said intermediate wall portion and forming a pair of axially spaced oil scraping rims, said portions having an inner apex and having confronting inner surfaces which abut, said confronting inner surfaces being in abutting relation at the inner apex and abutting continuously as they extend from said inner apex toward said intermediate wall, said abutting relation existing for at least part of the distance between said inner apex and the intermediate wall, said sidewall portions extending radially inwardly relative to said intermediate wall in a direction opposite from that of said radially outwardly extending portions, and said intermediate wall, said oil scraping rims, and said sidewalls being formed from a single steel strip.

2. The piston ring of claim 1 wherein said radially outwardly extending portions have outer surfaces which converge as they extend radially outwardly from said intermediate wall and said cylindrical surfaces comprise a wear resistant material coated on said juncture of said radially outwardly extending portions.

3. The piston ring of claim 2 wherein said wear resistant material is chromium.

4. The piston ring of claim 1 wherein said steel is a carbon-containing chromium alloy steel.

5. An oil control piston ring in accordance with claim 1 in which the inner surface of the sidewalls intersect the intermediate wall at substantially a right angle with an inward or outward flare not exceeding 0.00015" measured over 0.050" of the sidewalls from a point 0.020" from the radially innermost extent of said sidewall portions.

6. The oil control ring of claim 1 in combination with an expander ring having leg portions and a base portion forming an outwardly opening channel and dimensioned to fit with said inwardly opening channel of said oil control piston ring with the leg portions extending radially outwardly and the base portion forming the innermost portion of the expander ring, the outer extremities of the leg portions being positioned to engage the inner surface of the intermediate wall of said oil control piston ring next to the intersection of the sidewall portions with said intermediate wall to exert a radially outwardly directed expanding force on said oil control ring and maintain said cylindrical surfaces in oil scraping relation with said cylindrical bore.

7. The oil control piston ring of claim 1 wherein said confronting inner surfaces of said portions forming said oil scraping rims extend radially from said channel and abut for substantially all of the radial extent thereof.

8. An oil control piston ring in accordance with claim 1, 2 or 3 wherein each of said cylindrical surfaces has the same diameter.

9. An oil control piston ring in accordance with claim 1 further including circumferentially spaced vent openings in the intermediate wall, said openings being disposed between said oil scraping rims.

* * * * *